Dec. 26, 1933.   L. C. STUKENBORG   1,940,891
VEHICLE LIFT
Filed Aug. 26, 1931   2 Sheets-Sheet 2
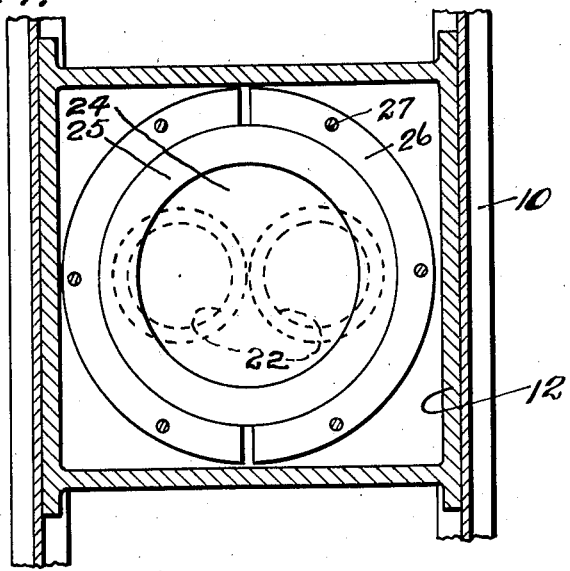
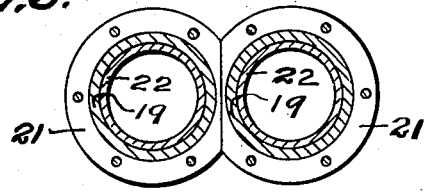
INVENTOR
Louis C. Stukenborg Patented Dec. 26, 1933

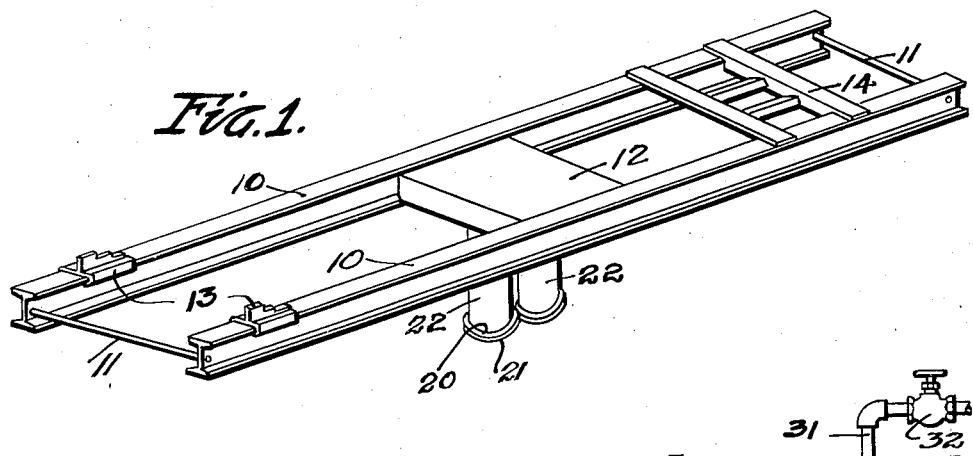
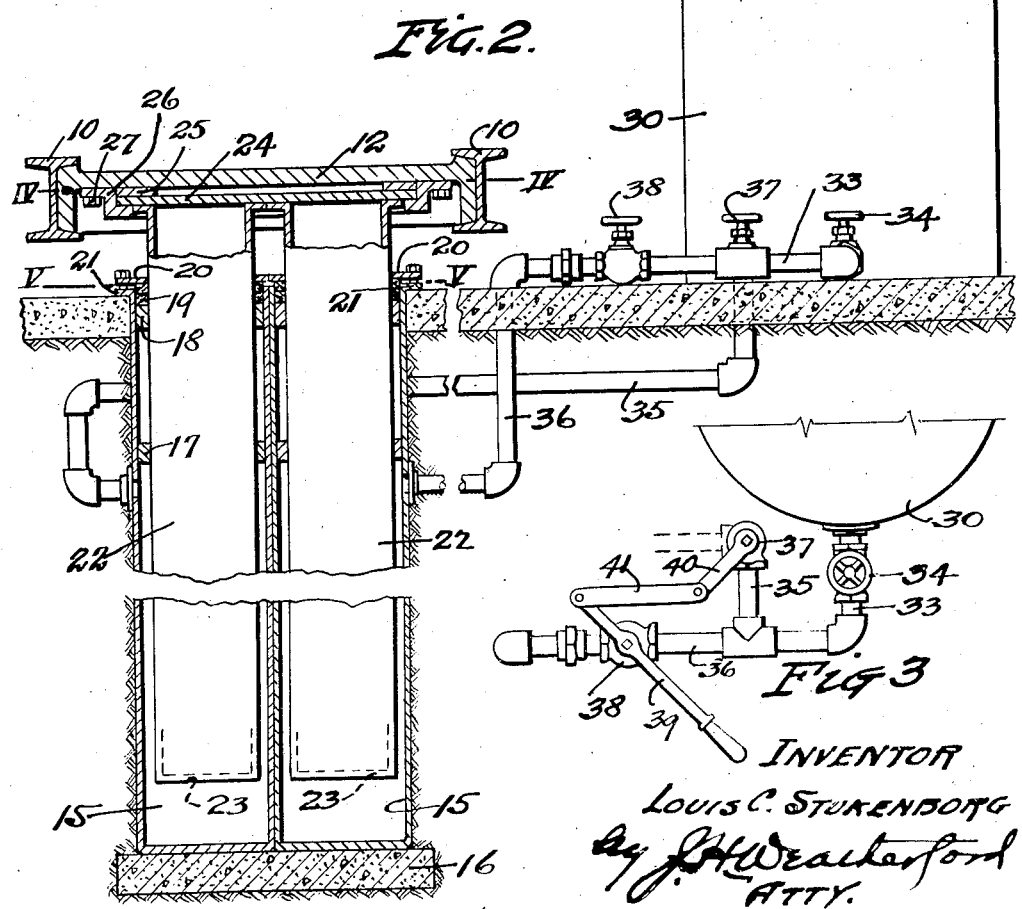

1,940,891

UNITED STATES PATENT OFFICE 1,940,891

VEHICLE LIFT

Louis C. Stukenborg, Memphis, Tenn.

Application August 26, 1931. Serial No. 559,367

7 Claims. (Cl. 254—93)

This invention relates to vehicle lifts more especially for raising an automobile for servicing, and is in part a continuation of my patent on Rotary automobile lift structures patented December 9th, 1930, No. 1,784,554.

The objects of my invention are to provide a rotary lift which is simple and inexpensive in construction and which provides for a non-rotatable raising means and a supporting cradle rotatably secured thereto;

A further object is to provide in a rotary lift, dual raising means, which is available to support the load even under failure of a portion thereof to function; and To provide in a dual hydraulically actuated rotary lift, interlocking means for jointly controlling the lifting and/or lowering mechanism.

The means by which the foregoing and other objects are accomplished and the manner of their accomplishment will readily be understood from the following specification on reference to the accompanying drawings, in which:

Fig. 1 is a perspective view of a rotary automobile lift structure of the free wheel type provided with my improved construction.

Fig. 2 is an enlarged sectional elevation taken on the center line of the cylinders with the table turned at right angles to the position shown in Fig. 1.

Fig. 3 is a fragmentary plan showing arrangement of the interlocking valve control, and Figs. 4 and 5 are sections on the lines IV—IV and V—V respectively of Fig. 2.

Referring now to the drawings in which the various parts are indicated by numerals, 10, 10 are a pair of side rails, having their ends connected by braces 11. Disposed between and secured to the rails in usual or desired manner, is a rectangular casting 12. These parts constitute a superstructure which engages the understructure of an automobile to raise it. 13 are shoes especially provided to engage the front axle and 14 a cradle for engaging and supporting the differential housing of the rear axle.

15, 15 are a pair of cylinders of identical size which are assembled side by side and parallel and preferably secured the one to the other as by welding. These cylinders as a unit are sunk with their tops substantially flush with the surface of the earth or floor level and preferably supported on a bed of concrete 16. 17 and 18 are guide rings within the cylinders, the latter forming the bottom of a stuffing box in which is placed suitable packing 19 which is held in place by a gland ring 20. Each cylinder has an outwardly extending annular flange to which the gland ring is secured by the usual bolts 21. As will be seen by reference to Fig. 5, the abutting portions of these flanges are cut away substantially tangent to the cylinder walls, to permit the cylinders to be brought close together, and the gland rings 20 are similarly cut away.

Disposed in the cylinders are hollow plungers 22, 22, each having a head 23 forming a closure for the bottom end thereof. These plungers are secured as by welding to a circular head 24, which preferably is a heavy, rigid flat disk.

The underside of the casting 12 may rest directly on this head but preferably an annular wearing member 25 is disposed therebetween. The casting is rotatably held in place on the head by an annular member 26 secured as by bolts 27, this member preferably being made in halves so that it may be more readily placed. So placed and secured the superstructure may readily be turned relatively to the pistons, though if it be desired a roller bearing such as is shown in my patent before mentioned may be interposed to reduce friction.

The plungers preferably are raised through the medium of liquid, ordinarily oil, supplied under pressure from a remote source, such as a reservoir 30 in which pressure is created by the introduction of air under pressure through a pipe 31 controlled by a valve 32. The preferred form of this system is shown in my pending application, Serial No. 525,395, for Air lifts.

The oil under pressure is led from the tank 30 through a pipe 33, controlled by a valve 34 to two pipes 35, 36, controlled respectively by valves 37 and 38 and through these pipes concurrently to the two cylinders. The valves may be independently controlled in which case the valves 37, 38 normally are left entirely open and control of raising and lowering effected by the valve 34, the valves 37, 38 being for emergency only, or the valves 37, 38 may be interconnected as shown in Fig. 3, by levers, 39 and 40 and a link 41 so that opening of one concurrently opens the other. In this case the valve 34 would be used for emergency only and might be omitted.

Plungers of considerable diameter are employed instead of the usual pistons with their relatively slender, and therefore somewhat flexible piston rods, and the cylinders are purposely placed as close together as possible, in order that the plungers and the interconnection therebetween may be so rigid that neither plunger can move without, or in any way differently than, the other, and therefore, irrespective of unequal loading, the two plungers must move upward and downward uniformly, simultaneously and equally.

In use the valves are opened to permit concurrent flow to both cylinders and raise the plungers. When raised both valves are closed to hold the plungers in raised position for such length of time as is desired.

In case then of the supply line to one cylinder breaking down or excessive leakage occurring, the closed valve on the other line would prevent the structure dropping under load.

Also under usual conditions loading is ordinarily done with the superstructure in one position, and it is therefore possible to position the two cylinders in alignment with such loading position of the superstructure, thus securing additional stiffness of structure during raising of the load, at which time the worst effect of unequal loading occurs.

It will be understood that the construction shown is largely typical, and that changes in arrangement and construction may be made without departing from the spirit and purpose of my invention and that it is not my intention in the claims to waive any modified form of structure or use of mechanical equivalents, which may be reasonably included within their scope.

It will further be understood that while two cylinders are shown three or even more may be used if desired.

Having described my invention, what I claim is:

1. In a device of the character described, dual cylinders adjacent and supported in parallelism, dual plungers disposed one in each of said cylinders said plungers being of uniform diameter throughout their length and extending above said cylinders, a rigid plate mounted on and secured rigidly to the upper ends of both plungers, whereby the full diameters of said plungers are available to permit rigid attachment of said plate thereto, and, through the stiffness of said plate, to compel synchronous upward and downward movement of said plungers, and lateral stability of the device when in raised position is promoted, and a superstructure mounted on said plate and adapted to engage and support an automobile or the like.

2. In a device of the character described, cylinders adjacent and supported in parallelism, plungers disposed one in each of said cylinders and projecting thereabove, a rigid member mounted on and secured rigidly to said plungers to compel concurrence of movement thereof, said member being centered over said plungers as a group, a head symmetrically disposed with relation to said group, and supported by said member, retaining means securing said head to said member, and a superstructure for the support of an automobile or the like, secured to said head, the diameters of said plungers at their junction with said member being at least as great as the distance between the proximate surfaces of adjacent plungers, whereby lateral stability of the device when in raised position is promoted, and such unity of movement of the plungers is definitely insured.

3. In a device of the character described, cylinders adjacent and supported in parallelism, plungers disposed one in each of said cylinders and projecting therefrom, a rigid circular member mounted on and secured rigidly to said plungers to compel unitary movement thereof, said member being centered over said plungers as a group with its peripheral edge extending therebeyond, a head symmetrically disposed with relation to said group, and rotatably supported thereby, retaining means rotatably securing said head to said member, preventing removal and/or overturning of said head, and a superstructure for the support of an automobile or the like, secured to said head, the diameters of said plungers at their junction with said member being greater than the distance between the proximate surfaces of adjacent plungers, whereby lateral rigidity of the device when in raised position is promoted, and unity of movement of the plungers is definitely insured.

4. In a device of the character described, cylinders adjacent and supported in parallelism, plungers disposed one in each of said cylinders and projecting therefrom, a rigid member mounted on and secured rigidly to the upper ends of both plungers for insuring unitary movement thereof, and an elongated superstructure mounted on and secured to said member and adapted to engage and support an automobile or the like, the diameters of said plungers at their junction with said rigid member being greater than the distance between the proximate surfaces of adjacent plungers, whereby lateral stability of the device when in raised position is promoted, and unity of movement of the plungers is definitely insured.

5. In a device of the character described, cylinders adjacent and secured together in parallelism, plungers disposed one in each of said cylinders and projecting therefrom, a rigid flat plate secured rigidly to the tops of said plungers, whereby the full diameter of said plungers is effective to establish rigid attachment of said plate thereto and thereby compel unitary movement of said attached plungers, and a superstructure for the engagement and support of an automobile or the like, rotatably mounted on said plate, the distance between proximate surfaces of said plungers being less than the diameters of said plungers, whereby lateral rigidity of the device when in raised position is promoted, and unity of movement of the plungers is insured.

6. In a device of the character described, dual cylinders adjacent and supported in parallelism, dual plungers of uniform diameter from end to end, disposed one in each of said cylinders, a rigid member mounted on and secured rigidly to the tops of said plungers, whereby the full diameters of said plungers are available to permit rigid attachment of said member thereto, and a superstructure secured to said member and adapted to engage and support an automobile or the like, the rigidity of said member as related to the spacing and diameter of said plungers being such as to compel concurrence of movement thereof and promote stability of said structure in raised position.

7. In a device of the character described, dual cylinders adjacent and supported in parallelism, dual plungers of uniform diameter throughout their lengths, disposed one in each of said cylinders and extending thereabove, a rigid member mounted on and secured rigidly to the tops of said plungers, whereby the full diameters of said plungers are available to permit rigid attachment of said member thereto, and a superstructure secured to said member and adapted to engage and support an automobile or the like, the maximum spacing of said cylinders being approximately equal to their diameters, whereby the rigidity of said member is available to compel synchronous upward and downward movement of said plungers, and stability of the device when in raised position is promoted.

LOUIS C. STUKENBORG.